Figure 1:
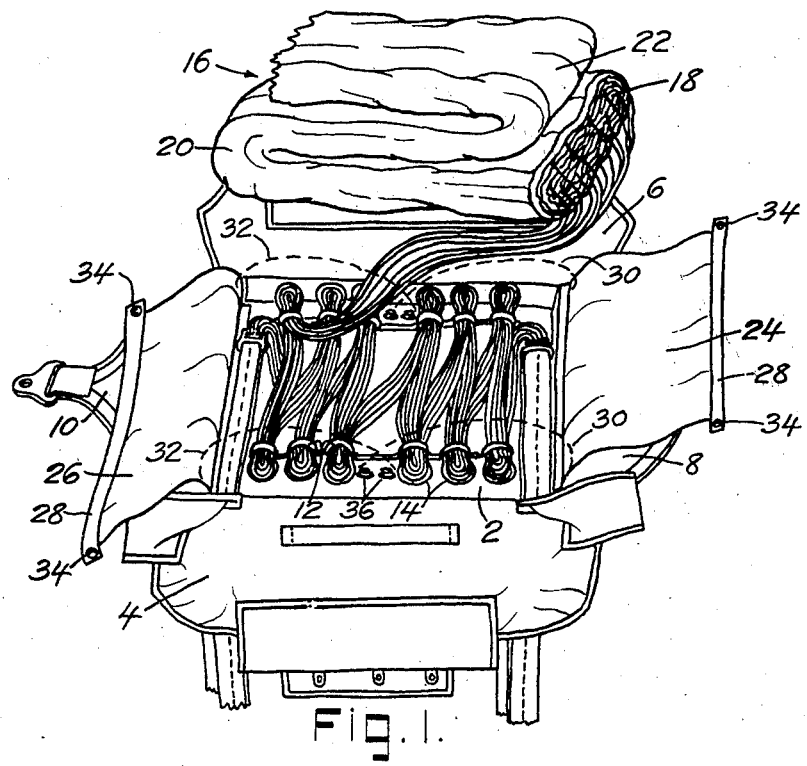

Dec. 21, 1943.   F. SMITH   2,337,168
PARACHUTE PACK
Filed Oct. 9, 1941   2 Sheets-Sheet 1

INVENTOR.
FLOYD SMITH
BY Albert Sperry.
ATTORNEY

Dec. 21, 1943.  F. SMITH  2,337,168
PARACHUTE PACK
Filed Oct. 9, 1941  2 Sheets-Sheet 2

INVENTOR.
FLOYD SMITH
BY Albert Sperry.
ATTORNEY

Patented Dec. 21, 1943

2,337,168

UNITED STATES PATENT OFFICE 2,337,168

PARACHUTE PACK

Floyd Smith, Manchester, Conn., assignor to Pioneer Parachute Company, Inc., Manchester, Conn., a corporation of Connecticut Application October 9, 1941, Serial No. 414,236

11 Claims. (Cl. 244—148)

My invention relates to parachute packs and containers, and particularly to novel constructions whereby the suspension lines of a parachute are prevented from being thrown over or about the canopy.

It has been usual heretofore to provide a parachute pack with a container or enclosing means having a base portion in which the suspension lines are stowed and to arrange the canopy of the parachute in zig-zag folds or otherwise and place it upon the suspension lines, after which the cover portion of the pack is closed over the canopy. A pilot chute or static line is usually attached to the peak of the canopy to draw the parachute out of the pack before the canopy opens. However, in closing the pack the silk of the canopy, which is springy when folded, is compressed to make a tight, small pack, with the result that when the cover is released the canopy springs up and the whole canopy often tumbles from the enclosure carrying a part of the suspension lines. The air currents to which the parachute is subjected then catch in the skirt and frequently toss it over the peak or upper portion of the canopy jerking the suspension lines from their retainers and causing the parachute to invert or causing one or more of the suspension lines to be thrown over the canopy. It is found that the occurrence of suspension lines over the canopy results when either a pilot chute or a static line attached to the aeroplane is used for drawing the parachute from the pack.

While parachutes often descend safely with one or more lines over the canopy, the fabric and seams of the canopy are frequently torn or are so weakened that extensive repairs are necessary. In conducting hundreds of drop tests with all types of parachute packs now in general use it has been found that the suspension lines are thrown over the canopy on an average of from 3 to 9 times for every 100 parachutes dropped. This has presented a very serious problem due to the cost and delays required to make the necessary repairs. Drop tests on six hundred parachute packs embodying the present invention have been made without a single instance of a suspension line being thrown over the canopy or inversion of the canopy. This not only renders the parachute safer and more certain in operation but has completely eliminated the delays and costs of repairing the parachutes.

This striking improvement in the operation of parachute packs results from the use of means for retaining the skirt of the canopy in place adjacent the base of the pack and over the suspension lines until the upper portion of the canopy has been drawn out to nearly its full length. Thereafter the skirt of the canopy is released and the suspension lines are drawn from the retainers only when the canopy is so extended that the suspension lines cannot be thrown over the top of the canopy.

The means employed for holding the skirt and suspension lines in place serve to shield the skirt of the canopy from air currents when the pack is opened. In the preferred form of my invention herein described a flap of material is secured to the base portion of the pack or container in position to be folded over the skirt of the canopy. The flap preferably is releasably held in position to shield the skirt from air currents by snap fasteners, break threads or other yieldable means. It is generally desirable also to provide the pack or container with a second flap of material which is secured to the opposite edge of the base of the pack and extends over the first reverse fold of the canopy above the skirt. This second flap places a further restraint upon the canopy and prevents the skirt from being jerked out of the pack as the upper portion of the canopy is whipped about in being drawn from the pack.

By retaining the skirt and lower portion of the canopy in place adjacent the base of the pack and over the suspension lines, the suspension lines are prevented from being drawn from their retainers until the peak and upper portion of the canopy have been drawn out and extended to such a length that the suspension lines cannot be thrown over the top of the canopy.

One of the objects of my invention is to provide a parachute pack with novel means for preventing the suspension lines from being thrown over the canopy when the pack is opened.

Another object of my invention is to provide a container for a parachute canopy with means for preventing the canopy from being inverted or injured by the suspension lines when the parachute is released from the container.

A further object of my invention is to provide a parachute pack with means for releasably retaining the skirt of the parachute canopy adjacent the base of the pack so as to prevent the skirt from being drawn from the pack until the peak and upper portion of the canopy have been drawn out to substantially their full length.

Another object of my invention is to provide a parachute pack with novel means for retaining the suspension lines in place within the pack until the parachute canopy has been drawn out to substantially its full length.

These and other objects and features of my invention will appear from the following description thereof in which reference is made to the figures of the accompanying drawings.

Figure 2:
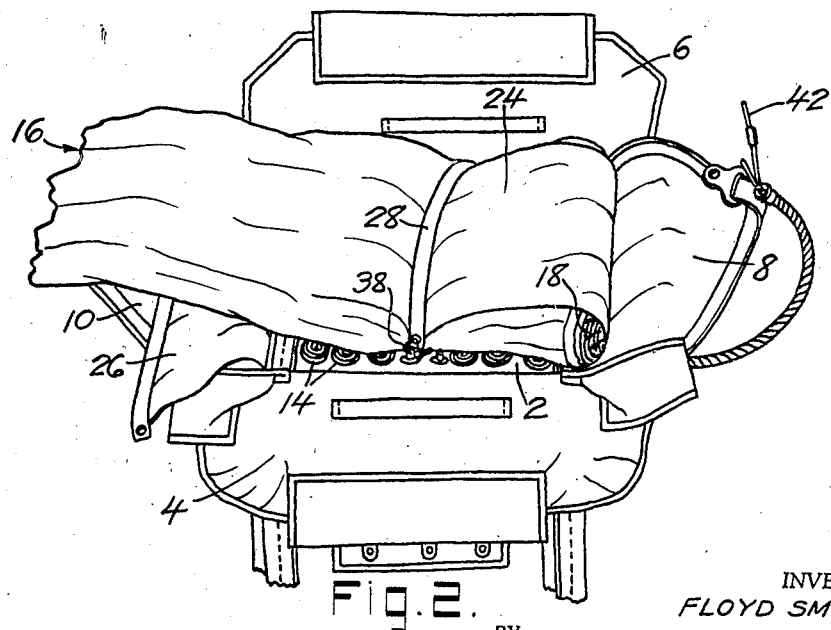
Figure 3:
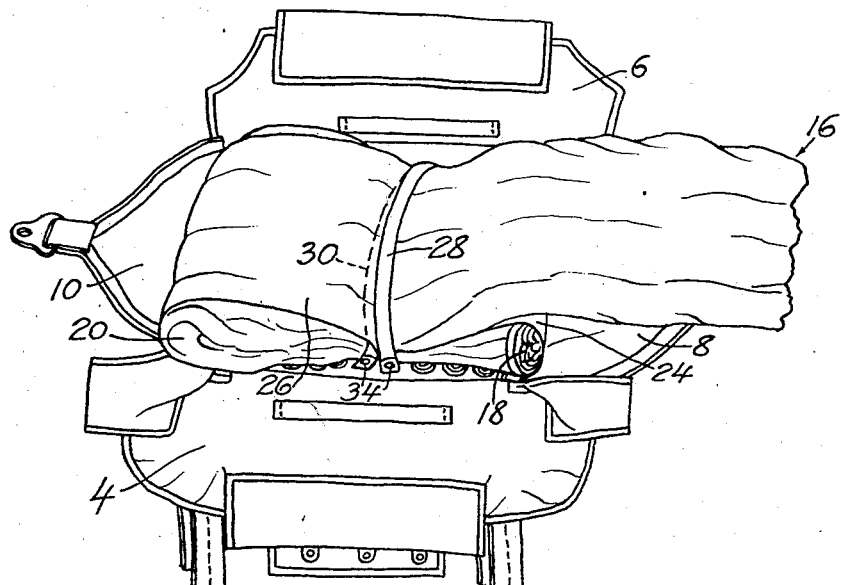
Figure 4:
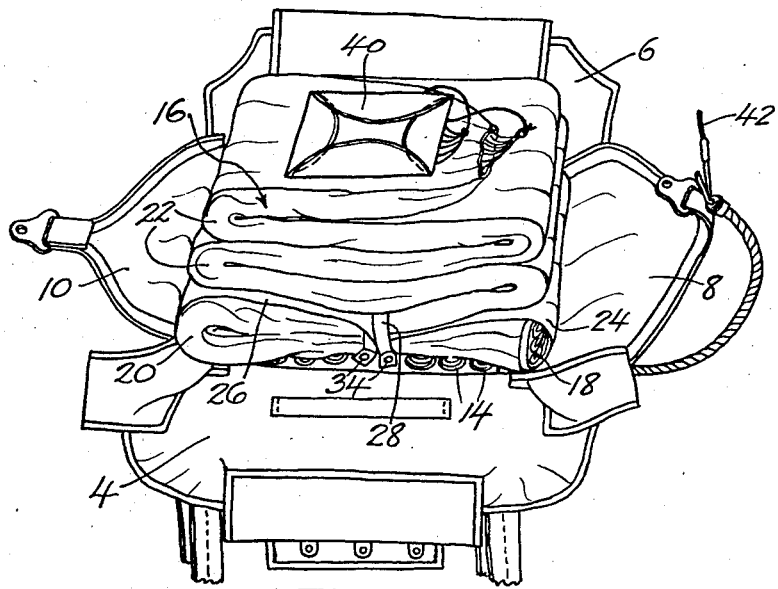

In the drawings:

Fig. 1 is a perspective of a typical parachute pack embodying my invention with the parachute canopy raised from the container, and Figs. 2, 3 and 4 are perspectives of the pack and canopy in successive stages of packing the canopy and arranging the flaps which retain and shield the skirt and suspension lines in the pack.

In that form of my invention illustrated in the figures of the drawings, a parachute pack is provided with a container or enclosing means having a base 2, to which are secured opposite side flaps 4 and 6, and opposite end flaps 8 and 10, the base of the pack is provided with retaining members 12 by which the suspension lines 14 are releasably retained in a suitable stowed arrangement adjacent the base of the pack. The parachute canopy 16 is arranged in folded relation, preferably in zig-zag folds, and is placed upon the suspension lines 14 so as to be enclosed within the pack by the side and end flaps thereof.

The skirt 18 of the canopy is generally placed near one end or side of the pack and over the suspension lines and the portion of the canopy adjacent the skirt is layed in a flat layer over the suspension lines and reversely folded as indicated at 20, adjacent the opposite side or end of the pack. Thereafter, the upper portion of the canopy is arranged in further zig-zag folds or otherwise, as indicated at 22, so that the canopy may be withdrawn from the pack peak foremost when the enclosing flaps or cover is released to open the pack.

The form of pack and the method of folding the parachute canopy and stowing the suspension lines described above are conventional and therefore it should be understood that the particular form and type of parachute pack illustrated in the drawings is intended only to be illustrative since my invention may be embodied in any type of parachute pack and the canopy and suspension lines may be folded or arranged in various ways and may be drawn from the pack by a pilot chute, static line or any other suitable means.

In accordance with my invention the parachute pack is provided with means for releasably retaining the skirt of the canopy and the suspension lines in place adjacent the base of the container or enclosing means until the upper portion of the canopy has been drawn out to substantially its full length. As illustrated, the means preferred are in the form of flaps of material 24 and 26 which are stitched or otherwise secured to the base 2 of the pack adjacent opposite ends or sides of the pack and preferably are of such length that the free ends 28 of the flaps extend into overlapping relation when folded inward as shown in dotted lines at 30 and 32.

In packing the parachute the skirt 18 of the canopy is positioned over the suspension lines and adjacent the flap 24 and the flap is folded inward over the skirt of the canopy so as to extend toward the opposite edge of the pack and lie beneath the upper folds of the canopy. The free edges 28 of the flap 24 is preferably located as indicated by the dotted line 30 and is releasably held in place by suitable means such as the snap fasteners 34.

The opposite flap 26 is stitched or secured to the base portion of the container along the side thereof opposite to that to which the flap 24 is secured and is formed to extend over the first reverse fold 20 of the canopy which is formed in that portion of the canopy adjacent the skirt. When folded inward the free edge 28 of the second flap 26 preferably extends to the position indicated at 32 so as to lie beneath the upper folds of the canopy. In this way the flaps 24 and 26 serve to shield the skirt of the canopy and the portion of the canopy adjacent the skirt, from air currents when the pack is opened. The skirt therefore will not tumble out of the pack immediately upon release of the enclosing flaps or cover of the pack and will also prevent the suspension lines from being drawn out of the retainers therefor until the canopy has been extended to substantially its full length.

In order that the skirt of the canopy and the suspension lines may be retained in position when the pack is opened and yet be released therefrom after the rest of the canopy has been drawn out, I prefer to provide the flaps with releasable retaining means, which as illustrated, are in the form of snap fasteners 34 located adjacent the corners of the free edges of the flaps. These snap fasteners engage cooperating fastening elements 36 carried by the base of the pack so that the flaps are releasably held in place when the pack is opened. Instead of using the snap fasteners any other suitable type of yieldable means such as the break thread 38 shown in Fig. 2 may be employed for releasably retaining the flaps in their shielding positions.

The portion of the canopy above the first reverse fold 20 and above the flaps 24 and 26 may be folded or arranged in any desired manner such as the zig-zag folds illustrated. Similarly the canopy may be drawn from the pack by any suitable means such as the pilot chute 40 attached to the peak of the canopy.

The action of the snap fasteners used or the strength of the break thread or other releasable means employed, is chosen to impose only such restriction to release of flaps 24 and 26 as will prevent the skirt from being dumped freely from the pack before the upper portion of the canopy has been properly extended. It is therefore possible to use very light construction in the releasable means and they may in some instances be omitted altogether and rely only on the slight friction which they impose on the canopy to prevent free release of the skirt. In any case, the shielding flaps retain the skirt of the canopy and the first fold thereof in place adjacent the base of the container and over the suspension lines so that the skirt and suspension lines are not exposed until the upper portion of the canopy has been fully extended. Thereafter the flaps 24 and 26 are released to free the skirt and suspension lines so that they in turn are drawn from the pack to permit the canopy to open fully and properly without any lines over the top thereof.

In that form of parachute pack illustrated the cover portion of the outer container or enclosing means is closed by folding the side and end flaps inward over the top of the folded parachute canopy and securing the cover flaps in place by means of the usual locking pin fastening 42 to which the rip cord or static line is fastened. However, it will be evident that the cover portion of the container may be otherwise formed and may be separable from the base portion thereof and the pack itself may be round, square, oblong or of any other preferred shape, style or configuration.

In view thereof it should be understood that the particular forms of my invention herein shown and described are intended to be illustrative of my invention and are not intended to limit the scope thereof.

I claim:

1. A parachute pack embodying enclosing means having a base portion and a cover portion, a parachute canopy located within said enclosing means and arranged in zig-zag folds with the skirt of the canopy positioned adjacent the base portion of the enclosing means, and a flap of material secured to the base portion of said enclosing means adjacent one edge thereof and extending toward the opposite edge of said base portion over the skirt of the canopy and beneath upper folds thereof in position to shield the skirt from air currents when the cover portion of the enclosing means is released to release the parachute.

2. A parachute pack embodying enclosing means having a base portion and a cover portion, a parachute canopy located within said enclosing means and arranged in zig-zag folds with the skirt of the canopy positioned adjacent the base portion of the enclosing means, a flap of material secured to the base portion of said enclosing means adjacent one edge thereof and extending toward the opposite edge of said base portion over the skirt of the canopy in position to shield the skirt from air currents when the cover portion of the enclosing means is released to release the parachute, and releasable means connected to said flap of material and to said base portion for releasably holding said flap over the skirt.

3. A parachute pack embodying enclosing means having a base portion and a cover portion, a parachute canopy located within said enclosing means and arranged in zig-zag folds with the skirt of the canopy positioned adjacent the base portion of the enclosing means, a flap of material secured to the base portion of said enclosing means adjacent one edge thereof and extending toward the opposite edge of said base portion over the skirt of the canopy in position to shield the skirt from air currents when the cover portion of the enclosing means is released to release the parachute, and snap fasteners connected to said flap of material and to said base portion for releasably holding said flap over the skirt.

4. A parachute pack embodying enclosing means having a base portion and a cover portion, a parachute canopy located within said enclosing means and arranged in zig-zag folds with the skirt of the canopy positioned adjacent the base portion of the enclosing means, a flap of material secured to the base portion of said enclosing means adjacent one edge thereof and extending toward the opposite edge of said base portion over the skirt of the canopy in position to shield the skirt from air currents when the cover portion of the enclosing means is released to release the parachute, and break threads connected to said flap of material and to said base portion for releasably holding said flap over the skirt.

5. A parachute pack embodying enclosing means having a base portion and a cover portion, a parachute canopy located within said enclosing means and arranged in zig-zag folds with the skirt of the canopy positioned adjacent the base portion of the enclosing means and near one edge thereof and with the first reverse fold of the canopy above the skirt located adjacent the opposite edge of said base portion, a flap of material secured to said base portion and extending over the skirt of the canopy, and a second flap of material secured to said base portion and extending over said first fold of the canopy, said flaps of material being positioned to shield the skirt and first fold of the canopy from air currents when the pack is opened and means releasably retaining the cover portion of the enclosing means in closed relation over the folded canopy.

6. A container for a parachute canopy having a base portion, a cover portion and means for shielding the skirt of the canopy from air currents when the container is opened, said means comprising a flap of material secured to said base portion adjacent one edge thereof and extending toward the opposite edge in position to be placed over the skirt of a canopy and between the folds thereof when a canopy is packed in said container.

7. A container for a parachute canopy having a base portion, a cover portion and means for shielding the skirt of the canopy from air currents when the container is opened, said means comprising a flap of material secured to said base portion adjacent one edge thereof and extending toward the opposite edge in position to be placed over the skirt of a canopy and between the folds thereof when a canopy is packed in said container, and means carried by said flap and said base portion for releasably retaining said flap in position over the skirt of the canopy.

8. A container for a parachute canopy having a base portion, a cover portion and means for shielding the skirt of the canopy from air currents when the container is opened, said means comprising two flaps of material, one of which is secured to the base portion of the container adjacent one edge thereof and the other of which is secured to the base portion of the container adjacent the opposite edge thereof, said flaps extending toward each other in position to be placed over the skirt of a canopy and over the first fold thereof and beneath upper portions of the canopy when a canopy is packed in the container.

9. A container for a parachute canopy having a base portion, a cover portion and means for shielding the skirt of the canopy from air currents when the container is opened, said means comprising two flaps of material, one of which is secured to the base portion of the container adjacent one edge thereof and the other of which is secured to the base portion of the container adjacent the opposite edge thereof, said flaps extending toward each other in position to be placed over the skirt of a canopy and over the first fold thereof and beneath upper portions of the canopy when a canopy is packed in the container, and means connected to said flaps and to said base portion for releasably securing the flaps thereto.

10. A container for a parachute canopy having a base portion, a cover portion and means for shielding the skirt of the canopy from air currents when the container is opened, said means comprising two flaps of material, one of which is secured to the base portion of the container adjacent one edge thereof and the other of which is secured to the base portion of the canopy adjacent the opposite edge thereof, said flaps extending toward each other in position to be placed over the skirt of a canopy and over the first fold thereof and beneath upper portions of the canopy when a canopy is packed in the container, the free edges of said flaps overlapping near the center of the pack and provided at the corners with means for releasably connecting said corners to the base portion of the container.

11. A parachute pack comprising an enclosure having a base and a cover, a parachute located within the enclosure with the suspension lines thereof stowed in place adjacent the base, the canopy of said parachute having the skirt thereof arranged in a flat layer over the suspension lines, a flap of material secured to said base adjacent one edge thereof and extending from said edge toward the opposite edge and over the skirt of the canopy, the portion of the canopy adjacent the skirt being reversely folded over the skirt and over said flap, a second flap of material secured to said base adjacent said opposite edge and extending toward the edge to which the first flap is secured and beyond the free edge of the first flap, said second flap overlying the reverse fold of the canopy, said flaps each having the corners thereof at the free edges of the flaps releasably secured to the base of the closure so as to hold the skirt, the first fold of the canopy and the suspension lines in place adjacent the base of the enclosure until the upper portion of the canopy has been extended, when the pack is opened, the remainder of the canopy above said first fold being located in folded relation over the second flap and beneath said cover, and means releasably retaining said cover is closed relation with respect to said base.

FLOYD SMITH.